UNITED STATES PATENT OFFICE.

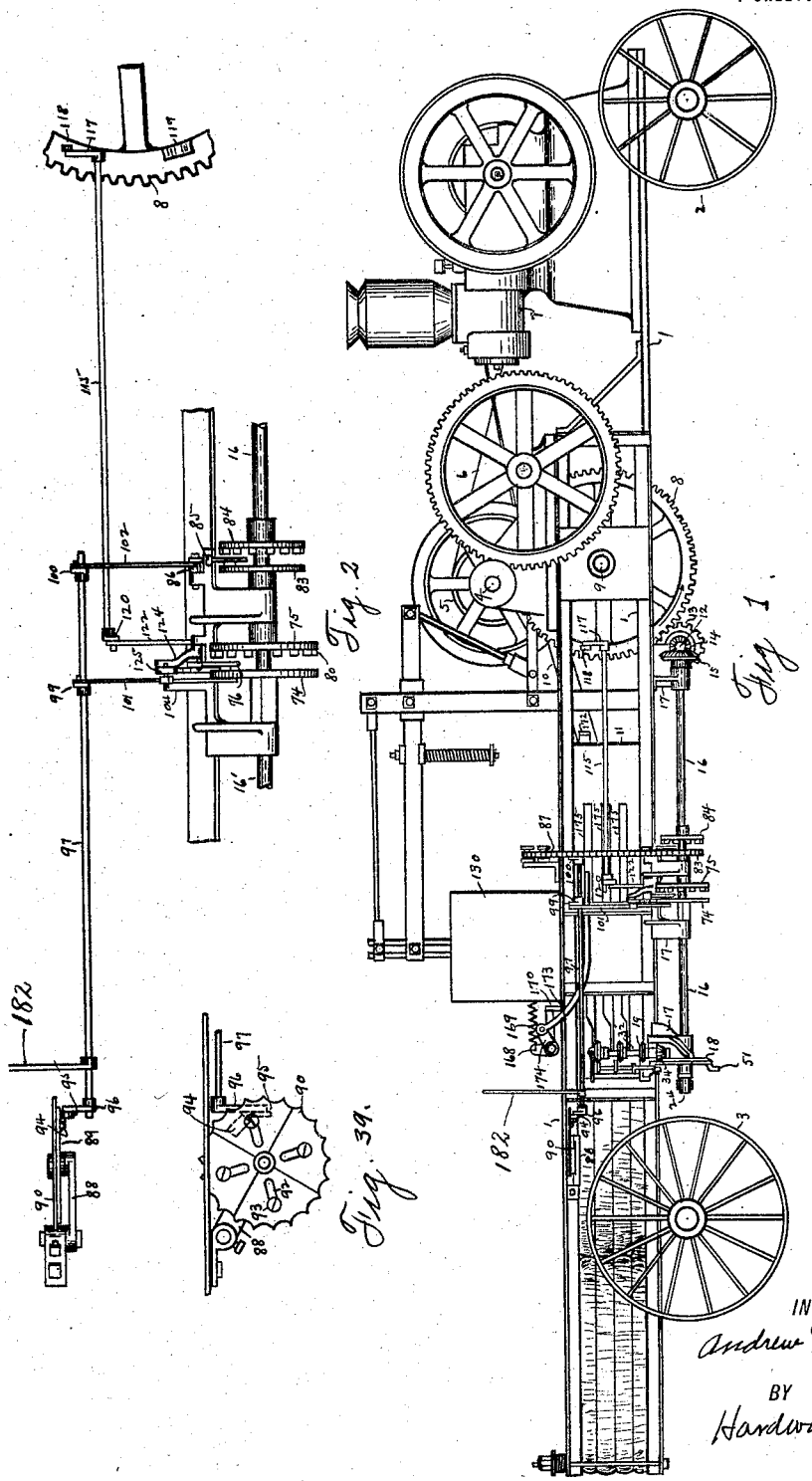

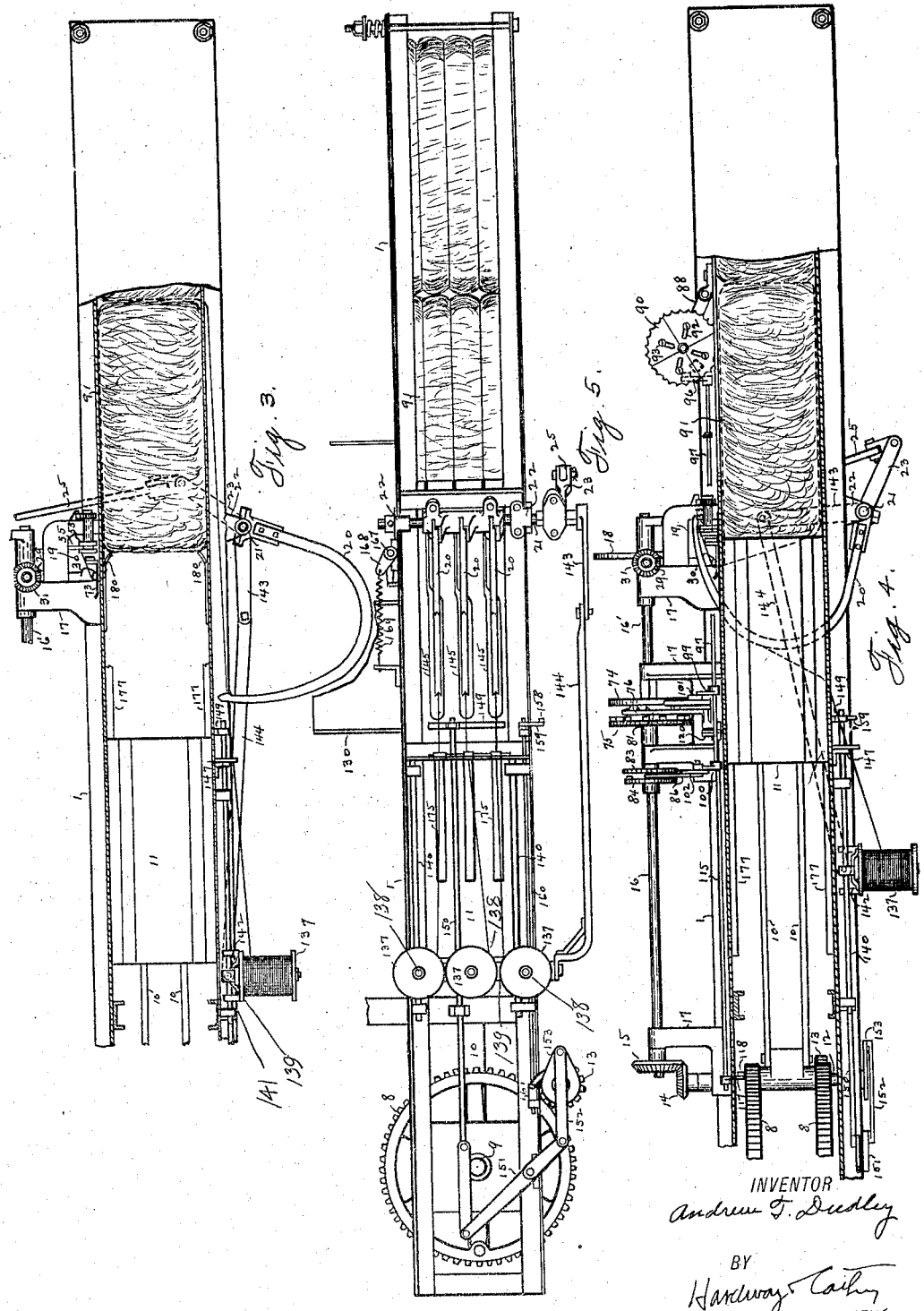

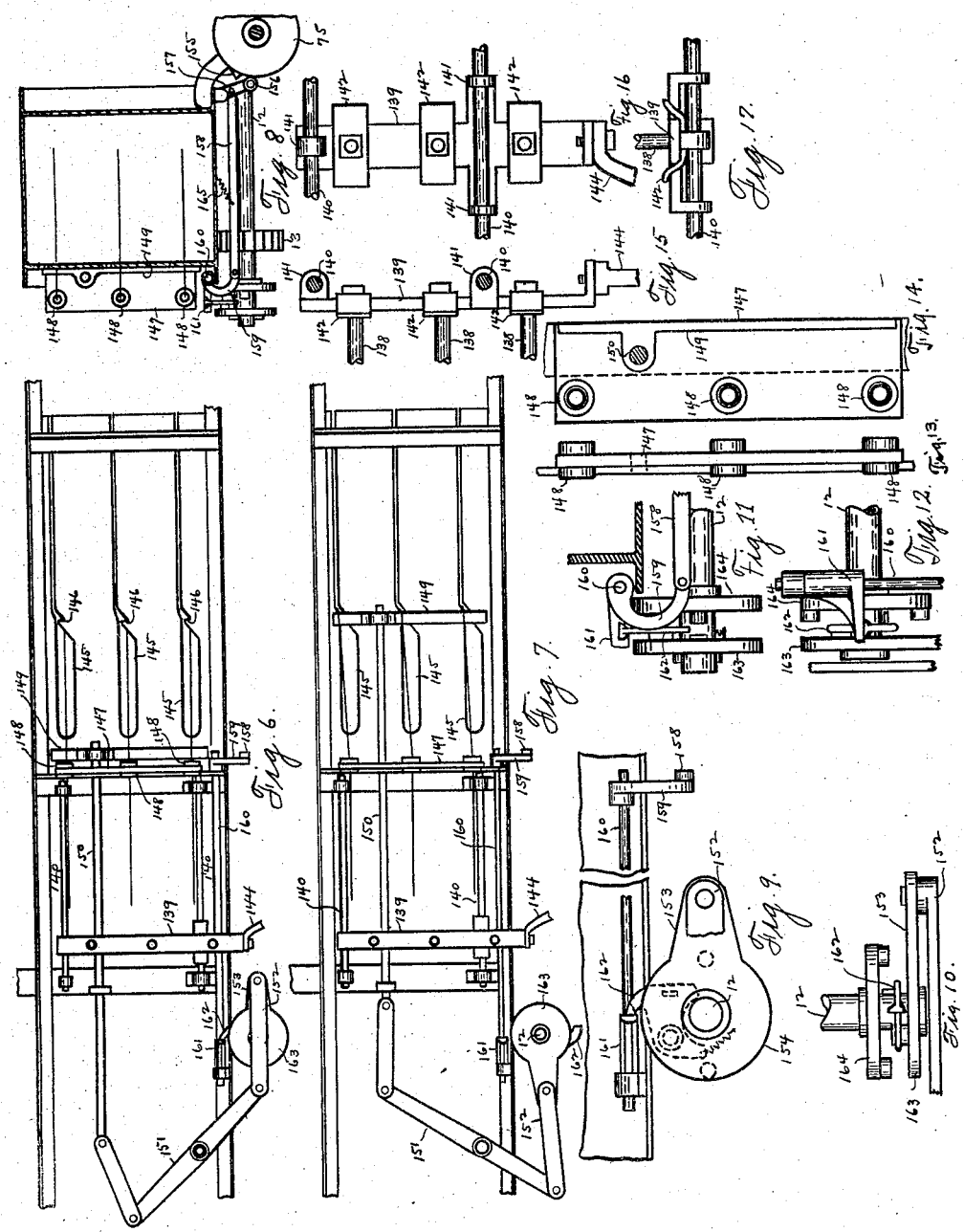

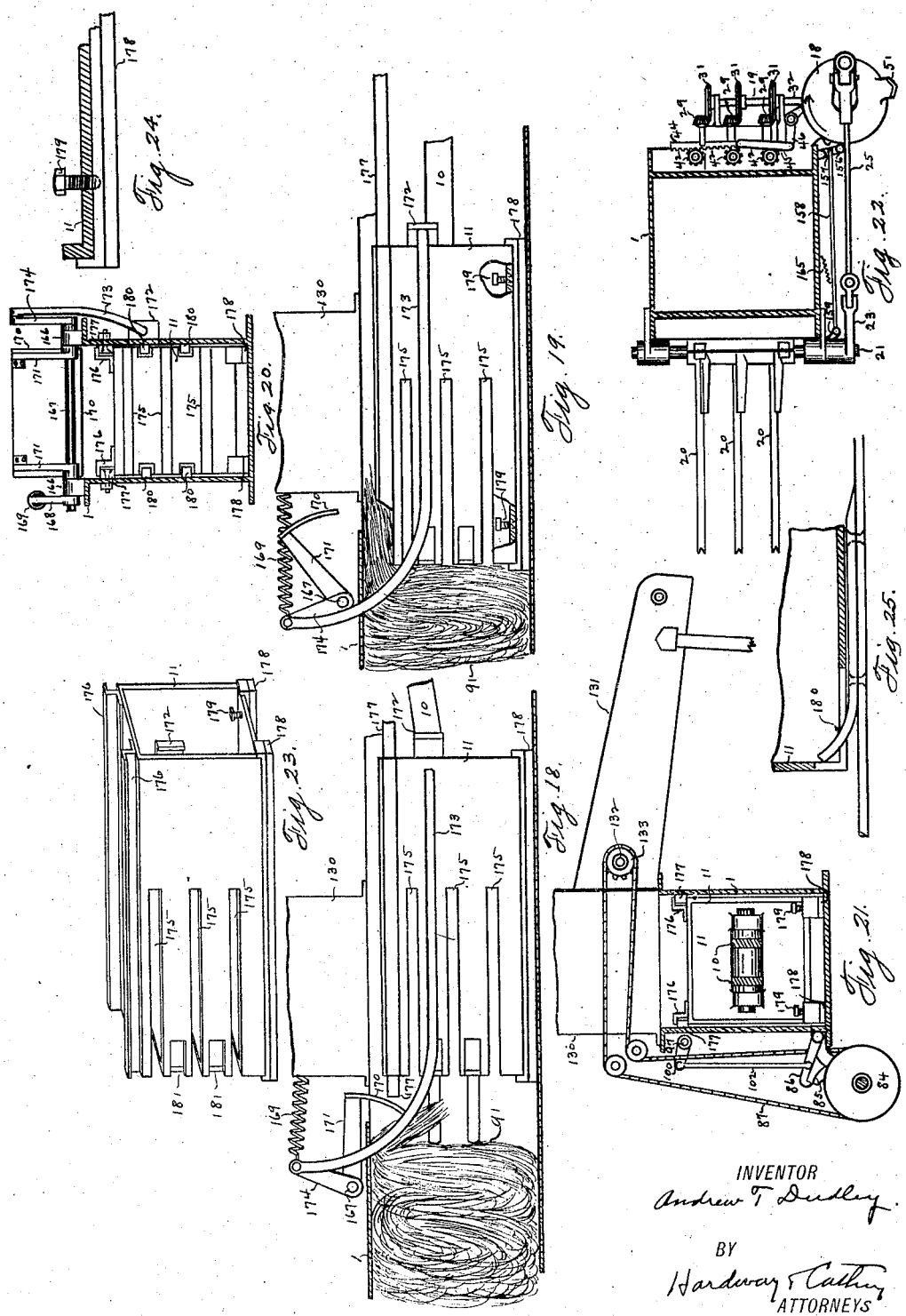

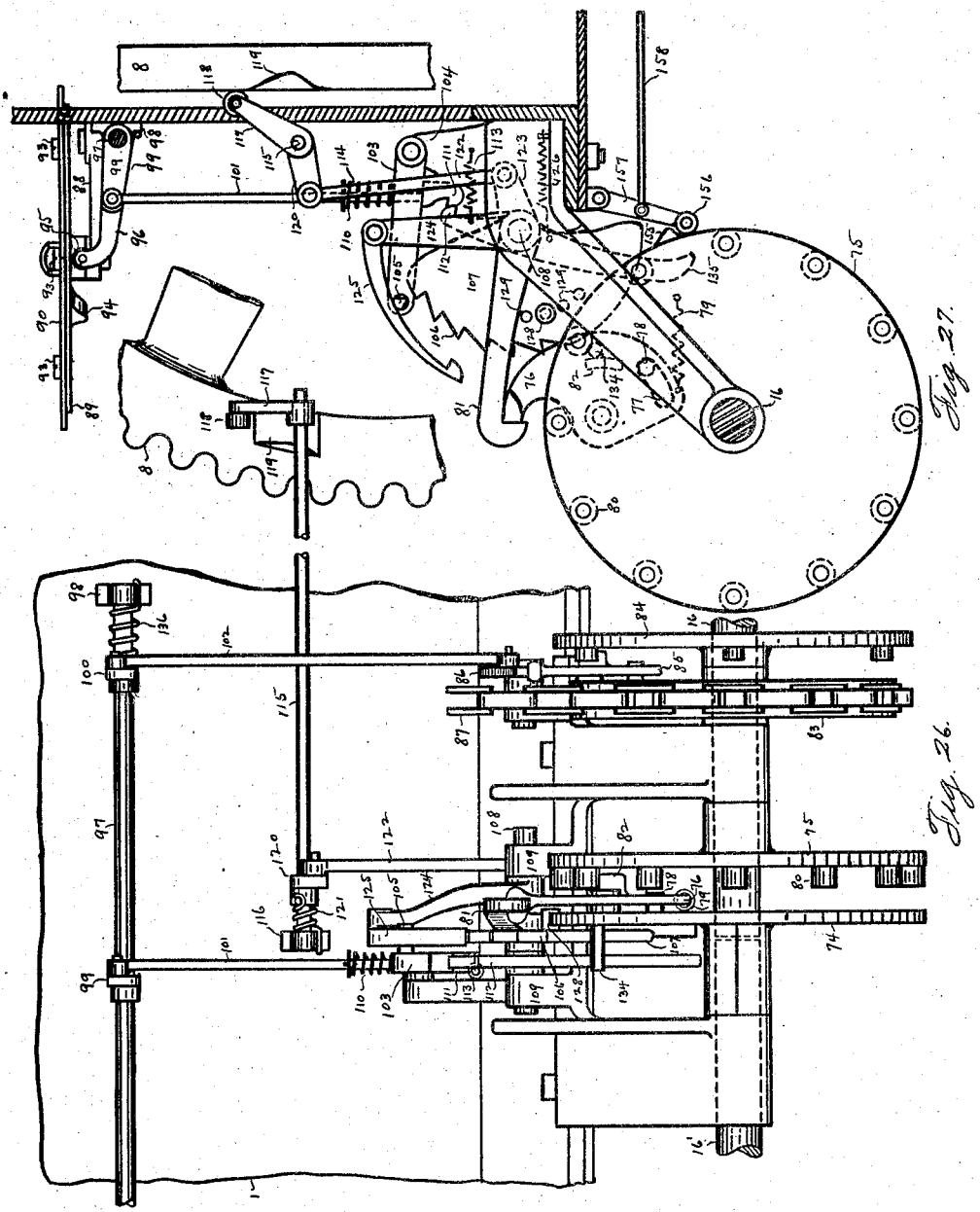

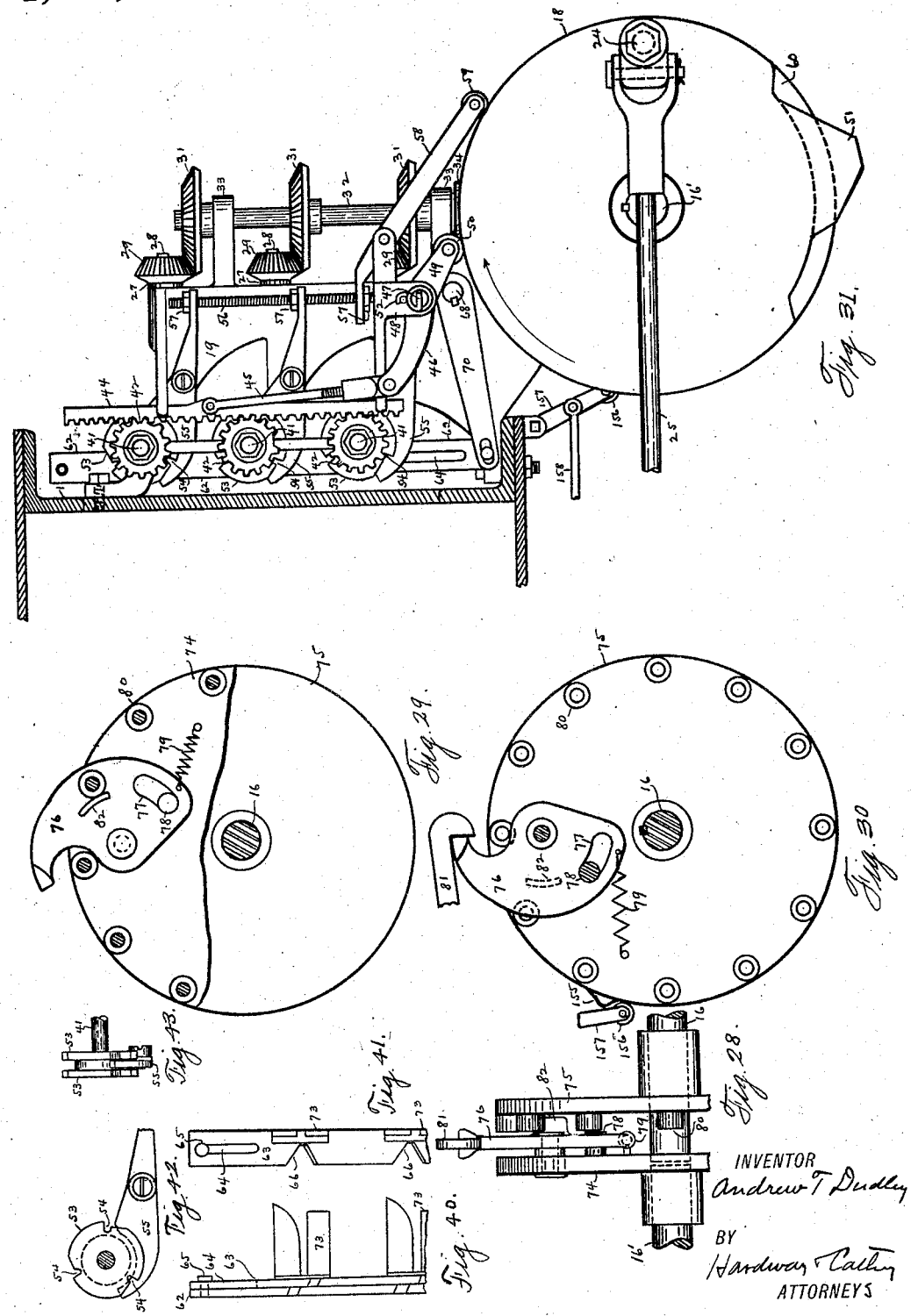

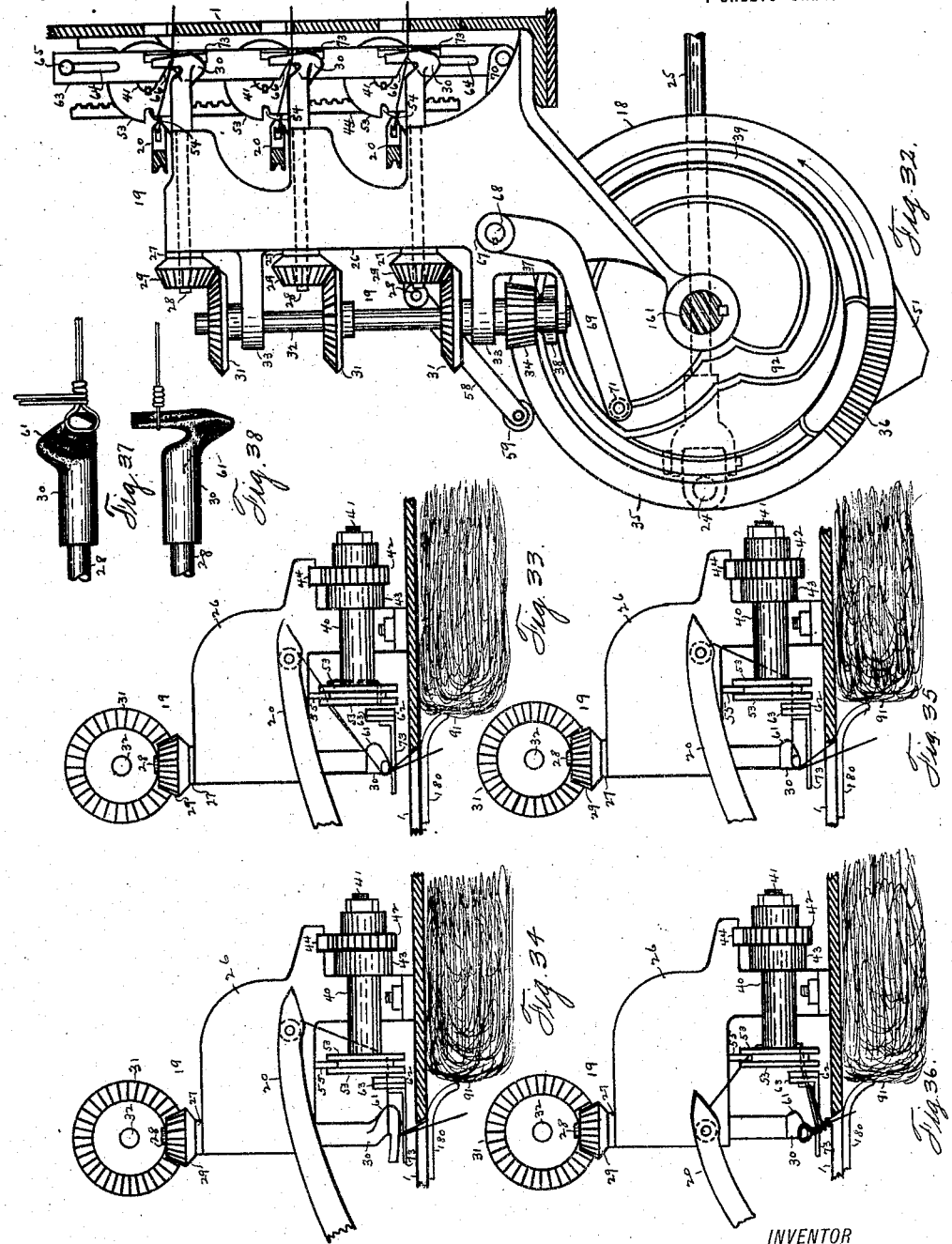

ANDREW T. DUDLEY, OF HOUSTON, TEXAS.

AUTOMATIC BALE-FORMING COMPRESS.

1,305,344.      Specification of Letters Patent.      Patented June 3, 1919.

Application filed February 1, 1917. Serial No. 145,949.

*To all whom it may concern:*

Be it known that I, ANDREW T. DUDLEY, a citizen of the United States, residing at Houston, in the county of Harris and State of Texas, have invented certain new and useful Improvements in Automatic Bale-Forming Compresses, of which the following is a specification.

This invention relates to new and useful improvements in an automatic bale forming compress.

The object of the invention is to provide a device of the character described which will automatically form bales of hay and other like material and automatically secure baling wires or cords around said bales when formed.

Another object of the invention is to provide an improved form of plunger for compressing the material into bales, and to further provide means for anchoring said plunger relative to the baling chamber and for taking up the wear thereof so as to insure a true and uniform movement thereof.

A further feature of the invention resides in the provision of a tucker which engages with the overlap of each charge upon the back stroke of the plunger, and brings said overlap within the range of the securing wires, and which is actuated by said plunger upon its forward stroke, and lifted clear of the plunger.

A further feature of the invention includes spring dogs, carried by the walls of the chamber, which engage behind each charge, when compressed to retain the compression thereof, said dogs working through side slots in the plunger.

A still further feature of the invention consists of a mechanism for carrying the wire around the bale and securing the same, and includes also means for determining the number of plunger strokes before said mechanism operates, and means for suspending the operation of the feeder while the bale is being tied.

The invention also embodies a measuring wheel in constant contact with the moving bale which determines the length of the bales.

A further object is to provide a device of the character described whose plunger drives each charge past the wire twisters, so that when the bale is completed and tied the knots formed by the twisters will be located at the ends of the bale rather than at the side and will not engage against the side wall of the compress as the bale moves therethrough.

With the above and other objects in view the invention has particular relation to certain novel features of construction, operation, and arrangement of parts, an example of which is given in this specification and illustrated in the accompanying drawings, wherein:—

Figure 1 is a side elevation of the device.

Fig. 2 is an enlarged fragmentary side elevation thereof.

Fig. 3 is a partial plan view showing the needles in withdrawing position.

Fig. 4 is a partial plan view showing the needles in coöperation with the twisters.

Fig. 5 shows a partial side elevation.

Fig. 6 shows a fragmentary side elevation showing the wire spacer in withdrawn position.

Fig. 7 shows a fragmentary side elevation showing the wire spacer operating against the wires.

Fig. 8 shows a transverse sectional view of the device.

Fig. 9 shows a fragmentary view of the spacer operative mechanism.

Figs. 10, 11 and 12 show partial plan, front and fragmentary plan views, respectively of the spacer clutch.

Figs. 13 and 14 show, respectively, edge and front views of the wire guides.

Figs. 15, 16 and 17 show, respectively, front, rear and top views of the spool holder.

Figs. 18 and 19 show fragmentary side views of the compress, showing the tucker in operative and withdrawn positions, respectively.

Fig. 20 shows a transverse sectional view showing the tucker in withdrawn position.

Figs. 21 and 22 show transverse sectional views of the device, the former showing the feeder and operative mechanism and the latter showing the relative position of the twisters and needles.

Fig. 23 shows a perspective view of the plunger.

Fig. 24 shows a fragmentary sectional view thereof showing the adjustable runners therefor.

Fig. 25 shows a fragmentary horizontal sectional view thereof in its relation to the retaining dogs carried by the baling chamber.

Figs. 26 and 27 show, respectively, side and end views of the clutches employed and co-acting parts.

Figs. 28, 29 and 30 show, respectively, fragmentary side, and fragmentary end, views, as viewed from opposite ends, of a clutch employed.

Fig. 31 shows a side view of the twister.

Fig. 32 is a view of the opposite side thereof.

Fig. 33 shows the twister, with the needle in position to carry the wire into engagement with the disk thereof.

Fig. 34 shows the twister with the wire drawn by said disk around the twister hook.

Fig. 35 shows the twister mechanism in position to operate to twist the loop of wire formed around the hook thereof.

Fig. 36 shows the twister after the knot has been formed.

Figs. 37 and 38 show plan and side views, respectively, of the twister hook.

Fig. 39 shows a plan view of the measuring wheel.

Figs. 40 and 41 show, respectively, plan and edge views of the cutter bars, and

Figs. 42 and 43 show, respectively, side and end views of the tension plate.

Referring now more particularly to the drawings wherein like numerals of reference designate similar parts in each of the figures, the numeral 1 refers to the framework which is formed into an oblong chamber where the bales are compressed. This bale forming chamber has the operative mechanism of the press mounted thereon and is supported by suitable carrier wheels 2 and 3. Rotatably mounted in suitable bearings is the transverse shaft 4, having the pulley 5 fixed upon one end thereof, and which is rotated by the belt 6 from the motor 7. The shaft 4 is in operative connection, with the gear wheels 8, 8, through a train of driving gears as shown, said gear wheels 8, 8, being fixed upon short shafts as 9 which are rotatable in suitable bearings carried by the framework, and pivoted to the gear wheels 8, 8, eccentrically, are the plunger rods 10, 10, which are connected to and drive the plunger 11. Rotatably mounted in suitable bearings underneath the framework is the transverse shaft 12 having the spur gear wheel 13 fixed thereon in mesh with and driven by one of the gears 8. One end of the shaft 12 has the bevel pinion 14 fixed thereon and in mesh with a similar pinion 15 fixed upon one end of the shaft 16. This last mentioned shaft is in alinement with and forms substantially a continuation of the shaft 16', said shafts being mounted in the bearings 17, 17, carried by the side of the chamber and fixed upon the end of the shaft 16' is the disk 18 which is in operative connection with the twister 19, fixed to the side of the chamber. The twisters are provided to receive the baling wire which is carried around the bale by the needles 20, 20, 20 and will be hereinafter described in detail. The needles are arcuate in form and are fixed to the vertical shaft 21 which is mounted in the bearings 22, 22, fixed to the side of the chamber opposite the twisters 19. Fixed to the lower end of the shaft 21 is the arm 23 whose free end is connected to the eccentric pin 24 carried by the disk 18 through the link 25. As the disk 18 rotates, the needles are alternately driven through and withdrawn from the baling chamber through the mechanism just described and the baling wire thereby carried around the bale and secured by the twisters 19.

These twisters will now be described in detail. The numeral 26 designates the twister frame which is secured to the side of the baling chamber and has three parallel bearings 27, 27, 27, one above the other wherein rotate the respective shafts 28, 28, 28, to the outer end of which are secured the bevel pinion 29, 29, 29, and the inner ends of which are formed into twister hooks 30, 30, 30. The pinions 29 are in mesh with the respective bevel gear wheels 31, 31, 31 which are fixed on the vertical shaft 32 rotatable in suitable bearings 33, 33, carried by the twister frame. The lower end of the shaft 32 has the bevel pinion 34 fixed thereon for a purpose to be hereinafter set forth. The drive shaft 16' which rotates the disk 18 is arranged to be clutched with and declutched from the motor 7 by means of a mechanism hereinafter to be described. The rim of the operative face of the disk 18 is beveled as at 35, a section of said beveled portion having gear teeth 36 which mesh with and cause a complete rotation of the pinion 34 as the disk rotates. The pinion 34 has an extended neck 37 whose inner side is formed into an oblong face 38 which rests against the annular rib or track 39 on the face of the disk 18 and by means of which the pinion 34 is prevented from turning except when in engagement with the teeth 36. The portion of the track opposite the teeth 36 is removed so that when said teeth mesh with the pinion 34, the pinion will be free to rotate. The rotation of the pinion 34 is imparted through the mechanism just described to the shafts 28, 28, 28 and the twister hooks 30, the mechanism being so geared that a rotation of the pinion 34 will cause a plurality of rotations of the twister hooks.

Disposed at right angles to the shafts 28 and rotatably mounted in bearings 40, 40, 40, carried by the frame 26 are the disk shafts 41, 41, 41, and fixed upon the outer ends of these shafts are the spur gear wheels 42, 42, 42, which are mounted to rotate loosely when rotated in one direction and to clutch with the corresponding clutch disks 43, 43, 43, fixed upon the shafts 41, when rotated in the other direction by any well known form of clutch that may be found practical. A rack member 44 is provided which is in mesh with the gear wheels 42 and which is reciprocated through the link 45. One end of this link is pivoted to said rack member and the other end thereof is pivoted to one end of the arm 46 which is integral with the shaft 47, this last mentioned shaft being rotatably mounted in suitable bearings as 48, carried by the twister frame. The shaft 47 also has the arm 49 extending at right angles thereto and the free end of which has the roller bearing 50 arranged in the path of the cam 51 carried by the back of the disk 18 and when said cam contacts with said bearing, it operates to partly rotate the shaft 47 and exert a downward pull on the rack member 44, thereby rotating the gear wheels 42, one third a revolution. The shaft 47 has a torsional spring 52 coiled therearound, one end of which is secured to the shaft and the other end to its bearing. When the cam 51 has passed the bearing 50, this spring will operate to reverse the movement of the link 45 causing the rack member to move upwardly reversing the rotation of the gears 42, said gears moving idly on the shafts 41 during this reverse movement. The inner end of each of the shafts 41 has two disks 53 fixed thereon and spaced apart, each of said disks having three peripheral alined notches 54 to receive the wire, said notches being spaced a uniform distance apart.

Tension levers 55, 55, 55, are provided which are pivoted to the frame 26. One end of each lever is arcuate and rests between the corresponding disks 53 and the opposite ends of the levers have vertically alined orifices through which the rod 56 extends loosely, said rod having the nuts 57 secured thereon and normally in contact with the ends of the corresponding levers 55. Pivoted to this rod is the lever 58 which is fulcrumed upon the frame 26 and whose outer end has a roller bearing 59 arranged in the path of the depression 60 which is in the periphery of the disk 18. The bearing 59 normally rests against the periphery of the disk 18 which operates through the lever 58 and rod 56 and the tension levers 55 to hold the arcuate ends of said last mentioned levers firmly against the wires resting in the notches of the disks 53. The mechanism is so geared that when the twister hooks 30, 30, 30, begin to turn, the depression 60 will be opposite the bearing 59 and the tension on said levers 55 will be released. The wires will thus be firmly held in said disks when the hooks are stationary but when they begin to turn, the tension will be released, permitting a certain amount of slippage so as to provide the necessary slack wire for the formation of the knot. The side of each hook facing the corresponding disk 53 has a spiral shaped cam 61, the purpose of which will be hereinafter described. Arranged alongside the twister hooks are the vertical cutter bars 62 and 63, the former of which is fixed to the frame and the latter of which has vertical slots 64, 64, therethrough, through which bolts 65, extend. These bolts are secured to the bar 62 and have enlarged heads to secure the bars together and permit the free vertical movement of the latter relative to the former. The bars have alined notches 66. Opposite the twister hooks 30 said notches have converging cutting edges and the respective disks 53 carry the corresponding wires into said notches. Rotatably mounted in the bearing 67, carried by the frame 26, is a transverse shaft 68 and fixed to the respective ends thereof are the oppositely extending arms 69 and 70, the free end of the latter of which is pivoted to the lower end of the cutter bar 63 and the free end of the former of which has the roller bearing 71 which projects into an eccentric groove 72 in the face of the disk 18. This groove is cam shaped and is formed so that its outer wall will operate against the bearing 71 and after the knot is formed will force the free end of the arm 69 in toward the center of the disk 18 thereby elevating the free end of the arm 70 and the bar 63 connected thereto, thus severing the wires resting in the notches 66 and stripping the twisted wire off of the twister hooks by means of the stripper hooks 73, carried by the bar 63 and engaging under said wire.

When the bale is completed, the disk 18 is clutched with the driving means through a mechanism hereinafter to be described said mechanism also operating to drive the needles around the end of the completed bale and into the position shown in Fig. 4. The needles carry the wire into engagement with the opposing notch 54 of the disk 53. Thereupon the cam 51 comes into contact with the opposing bearing 50, operating through the mechanism described to rotate the shaft 47 and exert a downward pull on the rack member 44 through the link 45. The disks 53 are thereby turned one third of the way around carrying the wire down into the opposing notches 66 and around the twister hooks 30 as shown in Fig. 34. The bevel teeth 36 have at this point, reached the pinion 34 and impart to it a single rotation causing a plurality of rotations of the hooks 30. When said hooks begin to rotate, the cams 61 operate to force the wire down into the angle of the hook as shown in Fig.

34 so as to insure the twisting of the loop formed around the hook by the rotations of said hooks. Simultaneously with this movement of said hooks 30 the bearing 59 drops into the depression 60 thereby releasing the tension of the levers 55 from the wire and permitting the necessary slippage of the wire in the disks 53. When the wires have been secured as explained, the free end of the arm 69 is depressed and the corresponding end of the arm 70, and the bar 63 are elevated severing the wires and stripping them from the hooks. The needles 20 are then withdrawn leaving the free ends of the wire secured in the disks 53. Meanwhile the cam 51 has released the bearing 50 and the tension of the spring 52 will operate to reverse the rotation of the shaft 47 with the result that an upward pull will be exerted on the rack 44 reversing the rotation of the gears 42 mounted thereon; also the bearing 59 will have passed the depression 60 and will again be forced outwardly by the periphery of the disk 18 again exerting a tension against the wires in the disks 53 and securing them firmly therein through the mechanism hereinbefore described and the twisters will then be in position to repeat operation of securing the wires around the next succeeding bale. The shafts 16 and 16' are connected and disconnected by means of a clutch mechanism including the disks 74 and 75 to the former of which the dog 76 is eccentrically pivoted. The inner end of this dog has the oblong slot 77 through which the pin 78, which projects from the inner side of the member 74, extends. The pull string 79 is attached at one end to the member 74 and at its other end to the inner end of the dog 76. The opposing face of the disk 75 has a plurality of rollers 80 projecting therefrom. When the hook 81 is engaged against the free end of the dog 76 the projection 82, carried by said dog 76, is swung around toward the center of the disk 75 and out of the path of the rollers 80 and said disk may then rotate independently but when the hook 81 is released from said dog, the pull string 79 forces the dog around into the position shown in Fig. 29 carrying the projection 82 of said dog into alinement with one of the rollers 80 of the disk 75 and as said last mentioned disk rotates, the dog is locked against the projecting pin 78 and the disk 74 is forced to rotate also, thereby clutching the two shafts together. The clutch employed in the device as hereinafter referred to are of the type just described and will not be described in further detail.

Loosely mounted upon the shaft 16 is a sprocket wheel 83 and fixed upon said shaft 16 is the clutch member 84. The clutch member 84 may be clutched with and declutched from said sprocket wheel by means of the dog 85, carried by said sprocket wheel. This dog is similar in construction and operation to the dog 76 and is brought into and held out of, engagement with the clutch member 84 by means of the hook 86. The sprocket chain 87 operates over the sprocket wheel 83 and operates the feeder which will be hereinafter described. Anchored to the side of the baling chamber is an arm 88 rotatably mounted upon the free end of which is the spider 89. Mounted upon this spider is a rotatable serrated disk 90 which projects through an alined slot in the side of the chamber and is constantly in engagement with the forming bale 91 and said disk is rotated by said bale as it moves along in the chamber. The disk is formed of segments, as shown, each segment provided with a slot 92 through which the set screw 93 extends, said set screw being threaded into the spider and having an enlarged head which clamps against the segment and holds it firmly in any desired position.

It is obvious by adjusting the segments, the circumference of the disk may be varied. The spider of this disk has a cam 94 arranged in the path of the roller bearing 95 carried by the free end of the arm 96. This arm is fixed upon the corresponding end of the shaft 97 which is rotatable in suitable bearings as 98 carried by the side of the chamber and has two arms 99 and 100 fixed thereto to the free end of the former of which the link 101 is pivoted and to the free end of the other of which the upper end of the link 102 is pivoted. The link 101 passes through a sliding bearing in the dog 103. This dog is pivoted at one end to the bearing 104 and its free end carries a lateral catch 105 adapted to engage with the ratchet teeth 106 of the segment 107. This segment is fixed upon the short shaft 108 rotatable in suitable bearings 109, 109. A compression spring 110 surrounds the link 101 one end thereof being attached to said link and the other end resting against the dog 103. The lower end of the link 101 is formed into a hook 111 arranged in position to engage with the corresponding hook 112. When the cam 94 engages against the roller 95, the free end of the arm 96 is depressed and the shaft 97 partially rotated forcing the link 101 downwardly, through the influence of the arm 99. A pull spring 113 is attached to the hook 112 and causes the hooks 111 and 112 to interlock when the former is moved downwardly in position to engage with the latter and the shaft 97 is thereby locked against reverse rotation. The coil spring 110 surrounds the link 101 and is attached thereto at one end, the other end of said spring resting against the dog 103 and holding the catch 105 in position to engage with the ratchet teeth 106 of the segment 107. A shaft 115 is rotatably mounted in suitable bearings as 116. One end of this shaft has the arm 117 fixed thereto, the free end of which has the roller bearing 118 alined with the depression 119 in the adjacent side of one of the gear wheels 8. The other end of the shaft 115 has the arm 120 fixed thereto. A coil spring 121 surrounds said shaft one end thereof being attached to the bearing 116 and the other end to the arm 120. Pivoted to the free end of the arm 120 is the link 122 the lower end of which is pivoted to the arm 123 which is loosely mounted on the shaft 108. Integral with the arm 123 is the upstanding arm 124 to the free end of which is pivoted the hook 125. When the catch 105 is lowered into engagement with the teeth 106 as hereinbefore explained, the hook 125, which rests on said catch, is also lowered and permitted to engage with said ratchet teeth. When the roller bearing 118 drops into the depression 119 the shaft 115 is partially rotated by the spring 121 and an upward pull exerted on the link 122 operating through the arms 123 and 124 to carry the hook 125 forward into engagement with one of the teeth 106. When the depression 119 passes said bearing, a reverse rotation will be imparted to the shaft 115 operating through the mechanism just described to exert a pull through said hook 125 against the segment 107, causing a partial rotation of said segment. This will be repeated with each rotation of the wheel 8, the hook 125 moving forward to engage with the tooth when the bearing 118 drops into the depression 119 and when said bearing passes said depression operating to partially rotate said segment, the catch 105 engaging with one of the teeth 106 and holding the segment as the hook 125 moves forward to engage with the next succeeding tooth. A pull spring 126 is attached at one end to the bearing 17 and at its other end to the lower part of the segment 107 and operates to bring the segment back to its original position when the catch 105 and the hook 125 are both disengaged therefrom. The segment 107 is provided with an adjustable pin 128 which will engage underneath the hook 81 and release it from the dog 76, releasing said dog to the influence of the spring 79 and thereby the projection 82 is carried into alinement with one of the rollers 80 and the shafts 16 and 16' are clutched together as hereinbefore explained. As stated, the pin 128 may be adjusted in either of the pin bearings 129 desired, said bearings being spaced apart the required distance. As soon as the hook 86 engages with the dog 85 the feeder will be immediately stopped as hereinbefore explained but the wire securing mechanism will not be set in motion until the shafts 16 and 16' are clutched together as explained, and this will not occur until the pin 128 has been carried into engagement with the hook 81 which will require a number of rotations of the gear wheel 8 thus permitting a number of plunger strokes to clear the chamber before the bale is tied, the number depending upon the location of the pin 128 with reference to the hook 81.

The feeder extends laterally relative to the compress chamber and is in alinement with and feeds the material into the hopper 130. It consists of a chute 131 having the usual means for conveying the hay up along the chute into the hopper said means being driven from the shaft 132 upon the outer end of which is fixed the sprocket wheel 133 driven by the sprocket chain 87. Upon the completion of each bale the feeder is suspended to permit the tying of the bale, without interference, as hereinbefore explained. After the bale is tied, it is necessary that the feeder be again set in motion and that the wire securing means be declutched from their driving means. In order to accomplish this object a pin 134 has been provided which projects from the back of the disk 74. The hook 112 is extended, said extended end being outwardly curved at the point 135. When the pin 134 contacts with the outwardly curved end 135 of the hook 112, said hook is disengaged from the hook 111 and released to the influence of the torsional spring 136 which surrounds the shaft 97 and one end of which is attached to the bearing 98 the other end thereof being attached to said shaft. By the influence of said spring the hook 111 is elevated, engaging against and lifting the dog 103 thereby disengaging the hook 125 from the teeth of the segment 107 and thereafter said hook moves back and forth idly until the completion of another bale when it again engages with the teeth of said segment as hereinbefore explained. When said hook is released from the ratchet teeth 106, the segment 107 is released to the pull of the spring 126 and the segment is thereby lowered permitting the hook 81 to drop into position to engage with the dog 76, upon the next rotation of the disk 74 and retract the dog and carry the projection 82 out of engagement with the opposing roller 80 thereby declutching the driving shaft 16 from the driven shaft 16'. At the same time the hook 86 will be disengaged from the dog 85 and the driving disk 84 will, in the manner hereinbefore explained, be clutched, with and drive the sprocket wheel 83 thus setting the feeder in motion simultaneously with the declutching of the wire securing mechanism preparatory to the formation of another bale.

The movement of the needles through the chamber is very swift and if the spools upon which the wire is wound are stationary a direct pull from the needles will cause said spools to spin and give off too much slack wire, or in some cases the needles will break the wire by the sudden pull thereon, and for that reason movable spools have been provided which move toward the needles as they pass through the chamber in carrying the wire around the bale and which move from the needles as the needles are withdrawn from the chamber, said spools rotating and gradually giving off the wire, during this movement toward and from said needles. The spools are indicated by the numerals 137, 137, 137, and they are rotatably mounted upon the spindles 138, 138, 138, which are fixed to and project out from a slidable frame 139. A track consisting of rods 140, 140, is fixed to the side of the baling chamber and the frame 139 has suitable bearings 141, 141, which move on said track so as to permit the frame and the spools carried thereby to move back and forth as hereinabove explained. Flat tension springs 142, 142, 142, are fixed to the frame and press against the spools so as to create a certain amount of tension thereagainst to prevent the spinning of said spools as the wire unwinds therefrom. Fixed to the lower end of the shaft 21 is the arm 143 to the free end of which one end of the link 144 is pivoted. The other end of this link is pivoted to the lower end of the frame 139. When the shaft 21 rotates to drive the needles through the chamber, the free end of the arm 143 swings around exerting a pull on the link 144 causing the spools to move toward the needles, creating a slack in the unwound wires which is immediately taken up by the needles thus preventing a sudden pull directly against the spools, although a portion of the wire is unwound from the spools as said spools are driven through the chamber into coöperation with the twister. When the shaft 21 reverses and the needles are withdrawn from the chamber, the spools are forced back to their original position gradually unwinding the wire from the spools and holding it ready to be delivered to the needles when the next bale is tied.

Before beginning the formation of a bale, it is necessary to properly space the wires across the chamber to prevent some of the loose hay from falling upon the wires and disarranging them and from falling between the bales. The baling chamber is provided with side slots 145, 145, 145, to permit the passage of the needles 20 and wires therethrough. These slots on the side of the chamber opposite the twisters gradually contract toward the discharging end of the chamber and the wire engaging hooks 146, 146, 146, are provided therein. Fixed to the side of the baling chamber is the vertical guide support 147 which carries the wire guides 148 through which the wires extend in passing from the spools through the needles eye to the twisters. In front of this support 147 is the vertical spacer bar 149 which is slidably mounted on the side of the baling chamber and connected to which is the push rod 150. One end of the lever 151 is pivoted to this rod and the other end thereof is pivoted to the link 152 which is connected to the free end of the arm 153 fixed to the driven member of the clutch 154. The disk 74 has a peripheral cam 155 arranged to contact with the roller bearing 156 carried by the lower end of the lever 157 whose upper end in pivoted to the frame of the machine. One end of the link 158 is pivoted to the lever 157 and the other end thereof is pivoted to the free end of the arm 159 which is fixed to the rod 160. This rod is rotatably mounted in suitable bearings carried by the side of the chamber and has also the arm 161 fixed thereto and extending at right angles therefrom and which is provided to engage against the free end of the dog 162 and when so engaged to declutch the driven member 163 of the clutch from the driving member 164 thereof, said clutch members being mounted upon and driven by the shaft 12 and the mechanism thereof being substantially the same as that of the clutches hereinbefore referred to and such as are now in common use. When the cam 155 moves against the roller 156, which occurs just at the completion of the tying of a bale, and the withdrawal of the needles from the chamber, a push is exerted against the link 158 operating through the arm 159 and the rod 160 to release the free end of the arm 161 from the clutch dog 162 and the driven member 163 is clutched with the shaft 12 and rotates therewith. During the rotation of said driven member, the arm 153 swings around, performing a complete rotation and operates through the lever 151 and the push rod 150 to drive the spacer bar 149 against the wires and carry them into engagement with the hooks 146, and then restore the spacer bar to its original position. Meanwhile the pull of the spring 165 which is attached to the link 158 will operate to restore said link to its original position and to carry the free end of the arm 161 into the path of the dog 162 operating to declutch the driving from the driven member as hereinbefore explained and to stop the movement of the spacer bar until again clutched upon the completion of another bale.

Each charge of hay driven forward by the plunger has a certain amount of overlap as shown in Figs. 18 and 19 and in order to make a smooth bale, it is necessary that the overlap of each charge be tucked down between the charges of material and that the overlap of the last charge be tucked down within the range of the tying wires. For this purpose I have provided a tucker which will now be described. Rotatably mounted in suitable bearings 166,166, is a shaft 167 to one end of which the arm 168 is fixed. A pull spring 169 is attached at one end to the free end of this arm and at its other end to the frame 1. A blade 170 is fixed relative to the shaft by means of the supporting arms 171, 171, which are fixed to said shaft and to the free ends of which said blade is secured. The pull of the spring 169 operates to force the blade 170 against the overlap, as shown in Fig. 18 and tuck the same down between the charges. The rear end of the plunger 11 carries the shoulder 172 and upon the forward stroke of the plunger this shoulder contacts against the push rod 173 and forces the same forwardly. The forward end of this push rod is pivoted to the free end of the arm 174 which is fixed upon the shaft 167 and as said push rod is driven forwardly it operates through said arm 174 to rotate the shaft 167 and elevate the blade 170 out of the alinement with the plunger and as the plunger moves back the spring 169 operates to force the blade 170 against the overlap as hereinbefore explained.

The plunger 11 is preferably constructed as shown in Fig. 23, the same being formed of metallic plates, its forward end having the transverse slots 175, 175, 175, in alinement with the corresponding side slots 145 of the compression chamber provided to permit the passage of the needles 20 through the chamber while the plunger is in its forward position. Angle irons 176, 176, are secured upon the top of the plunger at each side forming channels to receive the tracks 177, secured upon the sides of the compress chamber. The plunger is thus anchored in the compress chamber and the slots thereof are held in alinement with the side slots of the chamber. The bottom of the plunger is provided with suitable runners 178, 178, extending from end to end thereof on each side and adjustable by means of the adjusting screws 179. These runners are provided so that the wear on the bottom of the plunger may be taken up.

For the purpose of retaining the compression of the forming bales, spring dogs 180 have been secured to opposite sides of the compress chamber, the forward ends of said dogs being free and curving inwardly and the sides of the plunger at the forward ends being provided with side slots 181 to receive said dogs upon the forward stroke of the plunger. When the plunger moves forwardly to the limit of its stroke it carries the charge past said dog and they engage behind the charge and retain the compress of the forming bale and after the bale is completed they assist in retaining it in position to receive the securing wires.

In operation, the material to be compressed is manually delivered to the feeder and by it delivered into the hopper 130, from which it passes into the compress chamber in front of the plunger 11. The plunger reciprocates back and forth and compresses the bale forcing it along toward the discharge end of the chamber as the bale moves along the disk 90 is rotated until the cam 94 contacts with the roller 95 and through the shaft 97 and the mechanism hereinbefore described actuated thereby declutches the sprocket wheel 83 from the shaft 16 and stops the feeder during the tying of the bale. Thereafter the shaft 16 is clutched with and drives the shaft 16' in the manner hereinbefore described and through said last mentioned shaft the needles are driven into coöperation with the twisters and the twisters actuated to secure the wires around the bale. The influence of the link 144 exerted through the arm 143, on the shaft 21 operates to move the spools along their track toward the needles gradually delivering the unwound wire to the needles as they move toward the twisters. When the disk 18 has performed one rotation its driving shaft 16' is declutched from the shaft 16 as hereinbefore explained and the twisters and needles stop. In the meantime however, the needles will have been withdrawn from the chamber through the influence of the link 25 and the arm 23 and they will be in position to carry the wire around the next bale formed. Immediately after the completion of the tying of a bale and the withdrawal of the needles the cam 155 operating against the roller bearing 156, disengages the arm 161 from the dog 162 of the clutch 154 through the mechanism hereinbefore described thereby engaging the driven member of said clutch with the shaft 12. The arm 153 is thereby rotated operating through the mechanism connected therewith to force the spacer bar 149 against the wires and carry said wires into engagement with the hooks 146 whereby the wires are held in transverse position so that the material in the next succeeding bale will all fall behind said wires.

Provision has been made in the construction of this compress whereby the knots formed by the twisters will be located at the ends of the bales rather than at the sides. If said knots are located on the side of the bale they will engage against the side of the compress chamber as the bales move along through said chamber and will retard the movement of the bale, will wear said chamber side and the ends of the wires twisted together are liable to be pulled apart. This will not occur if the knots are located at the end of the bale. In order to properly locate the said knots, the twisters are so located that the plunger will drive each charge past said twisters as shown in Figs. 33 to 36 inclusive and then when the knot is twisted as shown in Fig. 36 and released from the twister hook, the knot will, by the expansion of the bale be drawn in against the end of said bale.

The measuring disk may be dispensed with, if desired, and the shaft 97 manually rotated, upon the completion of each bale, through the manual lever 182. This lever is fixed to the shaft 97, and by its manipulation the feeder may be stopped and started and the shafts 16 and 16' clutched together and declutched through the mechanism hereinbefore described.

What I claim is:

1. The combination with a compress chamber of a plunger arranged to reciprocate continuously therein during the operation of the machine, a plunger driving mechanism, a wire twister on one side of the chamber, a needle pivoted upon the opposite side thereof and provided to carry a securing wire across said chamber and into engagement with said twister while the plunger is in operation, a feeder provided to deliver material into said chamber, said feeder being in operative connection with and driven from the plunger driving mechanism, and means actuated by the material moving through said chamber and temporarily disconnecting said feeder from its driving mechanism and operatively connecting said twister and needle with said mechanism.

2. The combination with a compress chamber of a plunger arranged to reciprocate continuously therein during the operation of the machine, a driving mechanism operatively connected with the plunger, a wire twisting device upon one side of the chamber, a wire carrying needle pivoted upon the opposite side thereof, whereby the latter is brought into coöperation with the former while the plunger is in operation, a feeder for delivering material into said chamber, said feeder being operatively connected with and driven from said driving mechanism, means actuated by the material moving through said chamber and temporarily disconnecting said feeder from its driving means and thereby stopping the delivery of material into said chamber, said means thereafter operating to operatively connect said driving mechanism with said twister and needles.

3. In a device of the character described, a driving and a driven member, a clutch for operatively connecting and for disconnecting said members, a compress chamber, a plunger movably mounted in said chamber, a feeder for delivering material thereto, a wire securing means in operative connection with the driven member and operable while the plunger is in motion, a clutch through which said driving member is normally in operative connection with said feeder, a means actuated by the material moving through said compress chamber and operating at intervals to disconnect said driving member from said feeder and thereby temporarily stop the operation of the feeder, said actuated means thereafter operating to operatively connect said driving and driven members to operate said wire securing means.

4. In a device of the character described, the combination of a compress chamber, a reciprocating plunger for compressing material in said chamber, a tucker normally held in an operative position, and separate means whereby the tucker is moved from said position by the plunger.

5. In a device of the class described, the combination of a compress chamber, a reciprocating plunger for compressing material in said chamber, a tucker normally yieldingly held in an operative position, and separate means actuated by the plunger whereby the tucker is moved from said position.

6. In a device of the character described, the combination with a compress chamber, of a reciprocating plunger provided to compress material into said chamber, a tucker normally held yieldingly against the outwardly projecting ends of the material to hold said material against the end of the bale being compressed, and separate means operated by the plunger on its forward stroke to withdraw said tucker from the path of said plunger.

7. In a device of the character described, the combination with a compress chamber wherein material is compressed into a bale, of a plunger provided to compress said material, a tucker, a yieldable member normally holding the tucker against the exposed end of the forming bale, and separate means actuated by the plunger to withdraw the tucker from the path of the plunger during its forward stroke.

8. In a device of the character described, a plunger mounted upon adjustable runners carried by the plunger.

9. In a device of the character described, the combination of a compress chamber, a reciprocating plunger for compressing material in said chamber, a tucker normally yieldably held in an operative position, and separate means actuated by the plunger whereby during an operative stroke of the latter the tucker is moved from said position.

10. In a device of the character described, the combination with a compress chamber, of a plunger therein, said plunger being movable upon a track in said chamber and the forward end of the plunger and the sides of the chamber being provided with alined slots for the passage of needles, and adjustable runners upon which the plunger is mounted.

11. In a device of the character described, the combination with a compress chamber of engaging dogs secured to opposite sides thereof whose forward ends are flexible and inclined inwardly relative to said walls, a plunger reciprocating in said chamber whose forward end is provided with slots which receive said dogs upon the forward stroke of the plunger, and tracks on opposite sides of the chamber for slidably supporting the plunger.

12. A device of the character described including a compress chamber, a plunger operating therein, a plunger-operating-mechanism, a drive shaft, a driven shaft, a clutch for connecting said drive shaft and driven shaft, said clutch comprising a driving and a driven member, a clutch dog carried by said driven member, and arranged to lock said member to, and cause the same to rotate with, said driving member, a disengaging stop engaging against said clutch dog and holding the same out of engagement, means operated by the plunger-operating-mechanism for disengaging said stop from said clutch dog, said means being in turn controlled by said driven shaft, and a means operated by the compressed material whereby said disengaging means is permitted to engage with said stop at a predetermined time thereafter.

13. A device of the character described including a compress chamber having side slots, a plunger having transverse slots in its face in alinement with the side slots, said plunger being arranged to reciprocate in the chamber, wire twisters mounted on one side of the chamber, needles pivoted to the opposite side thereof and arranged to move through said slots and carry tying wire across the chamber and into engagement with the twisters, means for operating said twisters and needles, a plunger operating mechanism, means for locking said twister and needle operating means against movement, means, operated by the plunger-operating-mechanism, for releasing said locking means, and means for preventing the said release and thereafter operating at predetermined intervals to permit the releasing of said locking means.

14. A device of the character described including a compress chamber having side slots, a plunger having transverse slots in its face in alinement with the side slots, said plunger being arranged to reciprocate in the chamber, wire twisters mounted on one side of the chamber, needles pivoted to the opposite side thereof and arranged to move through said slots and carry tying wire across the chamber and into engagement with the twisters, means for operating said twisters and needles, a plunger operating mechanism, means for locking said twister and needle operating means against movement, means, operated by the plunger-operating-mechanism, for releasing said locking means, and means actuated by the compressed material to permit the releasing of said locking means at predetermined intervals.

15. A device of the character described including a compress chamber having side slots, a plunger having transverse slots in its face in alinement with the side slots, said plunger being arranged to reciprocate in the chamber, wire twisters mounted on one side of the chamber, needles pivoted to the opposite side thereof and arranged to move through said slots and carry tying wire across the chamber and into engagement with the twisters, means for operating said twisters and needles, a plunger operating mechanism, means for locking said twister and needle operating means against movement, means, operated by the plunger-operating-mechanism, for releasing said locking means, manually operated means for permitting the connection of said releasing means with said locking means whereby the locking means is disengaged and the twisters and needles are connected with their operating means.

16. A wire securing device embodying a wire twister, a wire carrying needle, an operative connection between said twister and needle whereby the latter is driven in coöperation with the former, a driving and a driven means the latter of which is in operative connection with said twister, a clutch for connecting and disconnecting said driving and driven means, a disengaging member normally holding the clutch disconnected, a mechanism actuated by the driving means to disengage said member from said clutch whereby the clutch is permitted to connect the driving and driven means, and means for predetermining the time of said connection.

17. A wire securing device embodying a wire twister, a wire carrying needle, an operative connection between said twister and needle whereby the latter is driven in coöperation with the former, a driving and a driven means, the latter of which is in operative connection with said twister, a clutch for connecting and disconnecting said driving and driven means, a disengaging member normally engaging with the clutch to hold the driving and driven means to disengage said member from the clutch and permit the connection of the driven with the driving means and means automatically fixing the time of said connection.

18. In a baling press, the combination of means for wiring formed bales, mechanism for driving the operative parts of the baling press, a clutch between the driving mechanism and said means, and clutch control members controlled by the driving mechanism and in accordance with movement of a bale formed in the press.

In testimony whereof I have signed my name to this specification in the presence of two subscribing witnesses.

ANDREW T. DUDLEY.

Witnesses:
M. G. HARGRAVE,
E. V. HARDWAY.